United States Patent
Cho

(10) Patent No.: US 10,257,512 B2
(45) Date of Patent: Apr. 9, 2019

(54) ELECTRONIC APPARATUS AND METHOD FOR DESIGNING MULTI-FORMAT DECODER

(71) Applicant: SAMSUNG ELECTRONICS CO., LTD., Suwon-si (KR)

(72) Inventor: Yong-rae Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 147 days.

(21) Appl. No.: 15/331,298

(22) Filed: Oct. 21, 2016

(65) Prior Publication Data

US 2017/0118470 A1  Apr. 27, 2017

(30) Foreign Application Priority Data

Oct. 21, 2015 (KR) ........................ 10-2015-0146404

(51) Int. Cl.

| H04N 7/12 | (2006.01) |
|---|---|
| H04N 19/12 | (2014.01) |
| H04N 19/18 | (2014.01) |
| H04N 19/48 | (2014.01) |
| H04N 19/625 | (2014.01) |

(52) U.S. Cl.
CPC ............. *H04N 19/12* (2014.11); *H04N 19/18* (2014.11); *H04N 19/48* (2014.11); *H04N 19/625* (2014.11)

(58) Field of Classification Search
CPC ........ H04N 19/12; H04N 19/18; H04N 19/48; H04N 19/625
USPC ...................................................... 375/240.2
See application file for complete search history.

(56) References Cited

U.S. PATENT DOCUMENTS

| 2006/0093221 A1* | 5/2006 | Kasutani ........... G06F 17/30256 |
|---|---|---|
| | | 382/191 |
| 2006/0126955 A1* | 6/2006 | Srinivasan ........... H04N 19/136 |
| | | 382/239 |
| 2007/0053604 A1 | 3/2007 | Lee et al. |

(Continued)

FOREIGN PATENT DOCUMENTS

| JP | 2012119969 A | 6/2012 |
|---|---|---|
| KR | 1020050096049 A | 10/2005 |
| KR | 100723411 B1 | 5/2007 |

(Continued)

*Primary Examiner* — Allen C Wong
(74) *Attorney, Agent, or Firm* — Sughrue Mion, PLLC

(57) ABSTRACT

Disclosed are a method of designing to transform an a single-format decoder, which performs image processing on an image signal using a first codec, to a multi-format decoder, which performs image processing on an image signal using a second codec, and an electronic apparatus thereof. The method includes processing first information about the first codec and second information about the second codec to produce a first transform coefficient associated with the first codec and a second transform coefficient associated with the second codec, through a predetermined transform method; determining a similarity between the first transform coefficient associated with the first codec and the second transform coefficient associated with the second codec; and converting the single-format decoder to the multi-format decoder by adding at least one of a shifter, an adder, and a subtractor, based on the determined similarity. Consequently, a reduction in chip size and cost may be achieved.

18 Claims, 10 Drawing Sheets

(56) References Cited

U.S. PATENT DOCUMENTS

2009/0016630 A1    1/2009  Paik et al.
2014/0314329 A1*  10/2014  Reznic ................ H04N 19/176
                                                              382/233

FOREIGN PATENT DOCUMENTS

| KR | 100827679 B1 | 5/2008 |
| KR | 100898058 B1 | 5/2009 |
| KR | 101412964 B1 | 6/2014 |
| KR | 1020140129417 A | 11/2014 |

* cited by examiner

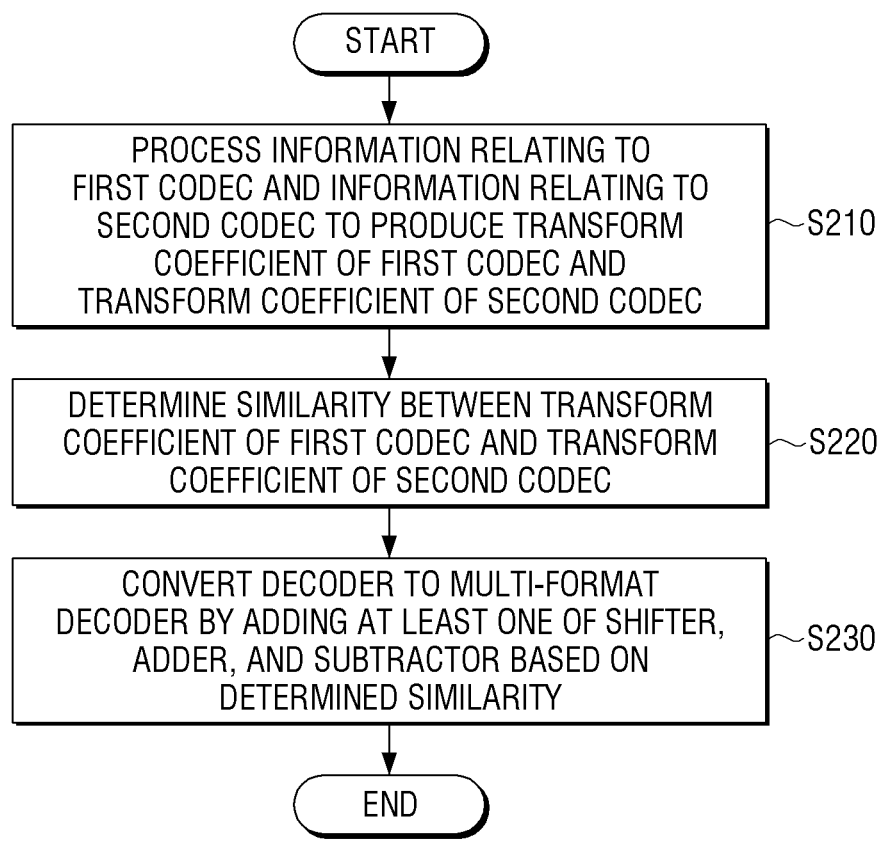

FIG. 3A

```
int AVS2_trans_core_4[4][4] = {
      {  32,   32,   32,   32 },
      {  42,   17,  -17,  -42 },
      {  32,  -32,  -32,   32 },
      {  17,  -42,   42,  -17 }
};
```

FIG. 3B

```
int HEVC_trans_core_4[4][4] = {
    { 64,  64,  64,  64 },
    { 83,  36, -36, -83 },
    { 64, -64, -64,  64 },
    { 36, -83,  83, -36 }
};
```

FIG. 4A

AVS2.0
rest[0]   = 8'sd32×X[0] + 8'sd32×X[1];
rest[1]   = 8'sd32×X[0] - 8'sd32×X[1];
rest[2]   = 8'sd42×Y[0] + 8'sd17×Y[1];
rest[3]   = 8'sd17×Y[0] - 8'sd42×Y[1];

FIG. 4B

```
HEVC
rest[0]    = 8'sd64×X[0] + 8'sd64×X[1];
rest[1]    = 8'sd64×X[0] - 8'sd64×X[1];
rest[2]    = 8'sd83×Y[0] + 8'sd36×Y[1];
rest[3]    = 8'sd36×Y[0] - 8'sd83×Y[1];
```

FIG. 5

NEW HEVC trf core
rest[0] = avs2_rest[0] <<1;
rest[1] = avs2_rest[1] <<1;
rest[2] = (avs2_rest[2] <<1) - Y[0] + (Y[1] <<1);
rest[3] = (avs2_rest[3] <<1) - (Y[0] <<1) + Y[1];

ELECTRONIC APPARATUS AND METHOD FOR DESIGNING MULTI-FORMAT DECODER

CROSS-REFERENCE TO RELATED APPLICATION

This application claims priority from Korean Patent Application No. 10-2015-0146404, filed on Oct. 21, 2015, in the Korean Intellectual Property Office, the entire disclosure of which is hereby incorporated by reference.

TECHNICAL FIELD

The present disclosure pertains to an electronic apparatus for and a method of designing a multi-format decoder and more particularly to an electronic apparatus to realize transforming among different codecs.

BACKGROUND

With the advancement of digital technology, various types of electronic products have been developed and distributed. In particular, various display apparatuses such as televisions, mobile phones, personal computers (PCs), notebook PCs, and personal digital assistants (PDAs) are widely used in households.

While the use of the display apparatuses has become more prevalent, the needs of the users have also become more sophisticated. Accordingly, efforts have been made by manufacturers to satisfy these ever-demanding needs of the user by incorporating more functionalities in these devices.

In particular, a display apparatus uses a codec for image processing. There are various types of codecs to choose from. In addition, because each of these codecs typically uses a unique type of converter, it is often difficult to combine more than one type of codec in an integrated manner on hardware.

For example, FIG. 1A is a block diagram of a transformer or an inverse transformer designed for a Moving Picture Experts Group (MPEG) series codec. The MPEG series codec for transforming or inverse transforming is composed of a first transformer 10, a first coefficient adjuster 12, a second transformer 14, and a second coefficient adjuster 16. FIG. 1B is a block diagram illustrating a transformer or an inverse transformer designed for an H.264 codec. The H.264 codec for transforming or inverse transforming is composed of a first transformer 30, a second transformer 32, and a second coefficient adjuster 34. Finally, FIG. 1C is a block diagram of a transformer or an inverse transformer designed for a VC-1 codec. The VC-first codec for transforming or inverse transforming is composed of a first transformer 50, a first coefficient adjuster 52, a second transformer 54, an improved transformer 56, and a second coefficient adjuster 58.

In other words, as illustrated in FIGS. 1A-1C, hardware implementations of various codecs are different in terms of a block size of a transforming unit and a transforming method used (e.g., discrete cosine transform (DCT), discrete sine transform (DST), integer DCT, etc.).

Accordingly, in order to process different codecs, separate hardware components may need to be implemented individually, which would then lead to an increased chip size and cost.

SUMMARY

One or more exemplary embodiments provide a method and an apparatus for converting a single-format decoder capable of performing image processing on an image signal by using a first codec to a multi-format decoder capable of performing image processing on an image signal by using a second codec.

The exemplary method may include processing, via a processor, first information about the first codec and second information about the second codec to produce a first transform coefficient associated with the first codec and a second transform coefficient of the second codec, through a predetermined transform method; determining a similarity between the first transform coefficient associated with the first codec and the second transform coefficient associated with the second codec; and converting a single-format decoder, which performs image processing on an image signal using the first codec, to a multi-format decoder, which performs image processing on the image signal using the second codec, by adding at least one of a shifter, an adder, and a subtractor to the single-format decoder, based on the determined similarity.

The predetermined transform method may include a partial-butterfly method, which divides and processes information regarding a codec.

The determining the similarity may include calculating a difference by comparing the first transform coefficient associated with the first codec and the second transform coefficient associated with the second codec, and determining the similarity based on the calculated difference.

The converting the single-format decoder may include determining third information required to transform the first transform coefficient associated with the first codec to the second transform coefficient associated with the second codec based on the calculated difference.

The converting the single-format decoder may include adding at least one of the shifter, the adder, and the subtractor to the single-format decoder further based on the determined third information.

The predetermined transform method of the first codec and the second codec may include a Fourier-related transform, wherein the first codec is different from the second codec.

According to an exemplary embodiment, a computer-readable recording medium may store a program to execute the method for converting a single-format decoder, which performs image processing on an image signal by using a first codec, to a multi-format decoder, which performs image processing on an image signal by using a second codec, as described above.

According to an exemplary embodiment, an electronic apparatus may be provided. The electronic apparatus may include a decoder configured to perform image processing on a image signal by using a first codec; and a processor configured to control the decoder to process first information about the first codec and second information about the second codec to produce a first transform coefficient associated with the first codec and a second transform coefficient associated with the second codec through a predetermined transform method, determine a similarity between the first transform coefficient associated with the first codec and the second transform coefficient associated with the second codec, and perform image processing on the image signal by using the second codec based on the determined similarity.

The predetermined transform method may include a partial-butterfly method, which divides and processes information regarding a codec.

The processor may be further configured to calculate a difference by comparing the first transform coefficient associated with the first codec and the second transform coefficient associated with the second codec, and determine the similarity based on the calculated difference.

The processor may be further configured to determine third information required to transform the first transform coefficient associated with the first codec to the second transform coefficient associated with the second codec based on the calculated difference.

The processor may be further configured to transform fourth information regarding the first codec to fifth information regarding the second codec, based on the determined third information.

The predetermined transform method of the first codec and the second codec may include a Fourier-related transform, wherein the first codec is different from the second codec.

According to various exemplary embodiments, the principles described in the present disclosure may have the effect of reducing a chip size and reducing cost.

BRIEF DESCRIPTION OF THE DRAWINGS

The above and/or other aspects will be more apparent by describing in detail exemplary embodiments, with reference to the accompanying drawings, in which:

FIG. 2 is a flowchart of a method of transforming a decoder to multi-format decoder according to an exemplary embodiment;

FIGS. 3A-3B are views illustrating a transforming coefficient of AVS 2.0 and HEVC codec according to an exemplary embodiment;

FIGS. 4A-4B illustrate information regarding AVS 2.0 and HEVC codecs through a transforming method according to an exemplary embodiment;

FIG. 5 illustrates a formula that expresses a difference among different codecs according to an exemplary embodiment.

DETAILED DESCRIPTION

Figure 1A:
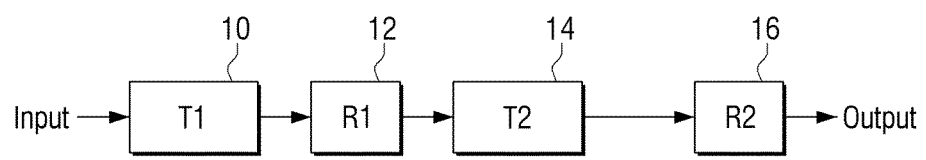
FIGS. 1A-1C are block diagrams illustrating conventional art.
Figure 1B:
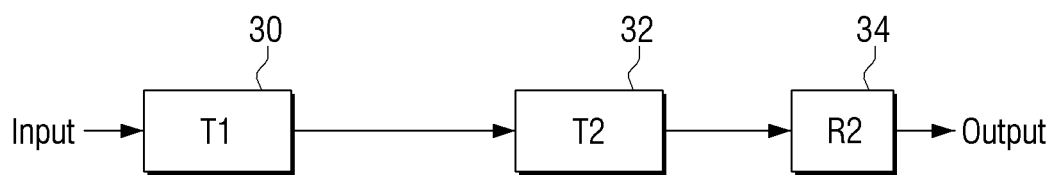
Figure 1C:
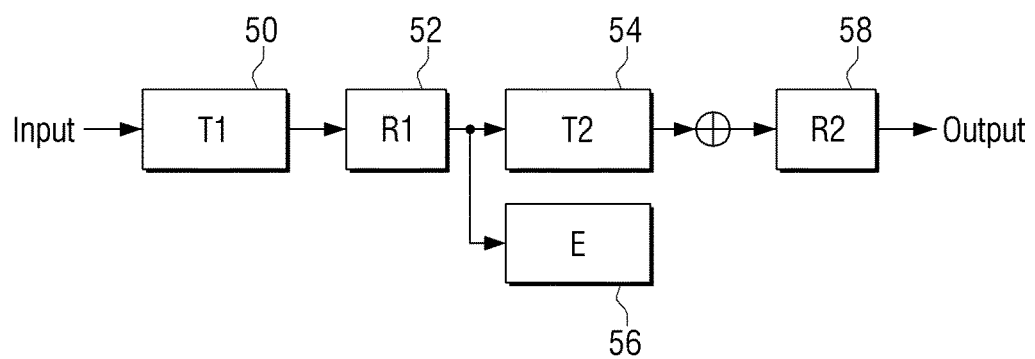

Hereinafter, the terms used in exemplary embodiments will be briefly explained, and exemplary embodiments will be described in greater detail with reference to the accompanying drawings.

Although the terms used in the exemplary embodiments are general terms, which are widely used in the present time considering the functions in the present disclosure, the terms may be changed depending on an intention of a person skilled in the art, a precedent, and introduction of new technology. In addition, in a special case, terms selected by the applicant may be used. In this case, the meaning of the terms will be explained in detail in the corresponding detailed descriptions. Therefore, the terms used in the exemplary embodiments should be defined based on the meaning thereof and the descriptions of the present disclosure, rather than based on their names only.

Although specific exemplary embodiments of the present disclosure are illustrated in the drawings and relevant detailed descriptions are provided, various changes can be made and various exemplary embodiments may be provided. Accordingly, various exemplary embodiments of the present disclosure are not limited to the specific embodiments and should be construed as including all changes and/or equivalents or substitutes included in the ideas and technological scopes of exemplary embodiments of the present disclosure. In the following description, well-known functions or constructions are not described in detail because they might obscure the inventive concept in unnecessary detail.

Hereinafter, exemplary embodiments will be described in greater detail with reference to the accompanying drawings. The matters defined in the description, such as detailed construction and elements, are provided to assist in a comprehensive understanding of the exemplary embodiments. However, it is apparent that the exemplary embodiments can be carried out by those of ordinary skill in the art without those specifically defined matters. In the description of the exemplary embodiment, certain detailed explanations of related art are omitted when it is deemed that they may unnecessarily obscure the essence of the inventive concept. In the explanation of the drawings, similar reference numerals are used for similar elements.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

FIG. 2 is a flowchart of a method of transforming a decoder to multi-format decoder according to an exemplary embodiment.

In this exemplary method, a decoder that performs image processing on an image signal (or video signal) using a first codec may be transformed to a multi-format decoder that performs image processing by using a second codec. Information regarding the first codec and information regarding the second codec may be processed to produce a first transform coefficient of the first codec and a second transform coefficient of the second codec through a predetermined transforming method (S210).

Here, the predetermined transform method may be a partial-butterfly method, which divides and processes preset codec information. To be specific, information regarding the first codec can be transformed to information including transform coefficient of the first codec through the partial-butterfly method, and information including a transform coefficient of the second coded through the partial-butterfly method. FIGS. 3A and 4B will be described later as examples.

The predetermined transform method of the present disclosure is not limited to the partial-butterfly, and various other transform methods may be used to transform information regarding the first codec and the second codec to information including the first codec transform coefficient and the second codec transform coefficient.

In step S220, a similarity between the transform coefficient of the first codec and the transform coefficient of the second codec may be determined. In step S230, a decoder may be converted to a multi-format decoder by adding a shifter, adder, or a subtractor to the decoder based on the determined similarity. The conversion may include designing the conversion process by determining the types and numbers of shifters, adders, and/or subtractors to be added.

FIGS. 3A-3B are views illustrating a transforming coefficient of AVS 2.0 and High Efficiency Video Coding (HEVC) codec according to an exemplary embodiment.

FIG. 3A illustrates exemplary transform coefficients of 4×4 discrete cosine transform (DCT) of the AVS 2.0 codec. Herein, DCT uses an orthogonal transform coding method in image processing.

To be specific, transform coefficients of 4×4 DCT of AVS 2.0 codec are represented as {32, 32, 32, 32}, {42, 17, −17, −42}, {32, −32, −32, 32}, {17, −42, 42, −17}.

In addition, FIG. 3B illustrates the transform coefficients of 4×4 DCT matrix of HEVC codec. Here, the HEVC (H.265) codec may have compression efficiency that is about twice as high as a previous H.264 codec, and requires less computing power (i.e., about half the size) compared to the previous H.264 codec, and accordingly, the HEVC codec is suited for ultra-high definition (UHD) quality image.

To be specific, the transform coefficients of the 4×4 DCT of HEVC codec are represented as {64, 64, 64, 64}, {83, 36, −36, −83}, {64, −64, −64, 64}, {36, −83, 83, −36}.

Here, FIGS. 3A and 3B show an example block of transform unit that has a size of 4×4. Although in this example the matrix is shown to have 4 rows of 4 transform coefficients, if the size of a block of transform is, for example, 8×8, 16×16, 32×32, etc., the transform coefficients of DCT can be expressed in 8 rows of 8 transform coefficients, 16 rows of 16 transform coefficients, 32 rows of 32 transform coefficients, etc.

In addition, although FIGS. 3A and 3B show a DCT matrix as an example, other matrices such as a discrete sine transform (DST) matrix and an integer DCT matrix may be used as well.

In addition, transform coefficients of 4∴4 DCT matrix of AVS 2.0 codec and transform coefficients of 4∴4 DCT matrix of HEVC codec may be represented by another type of formula that includes each of the transform coefficients of 4∴4 DCT matrix of AVS 2.0 codec and transform coefficients of 4∴4 DCT matrix of HEVC codec through the Partial-Butterfly. These examples will be described through FIGS. 4A and 4B.

FIGS. 4A-4B illustrate information regarding AVS 2.0 and HEVC codecs through a transforming method according to an exemplary embodiment.

FIG. 4A illustrates information related to the AVS 2.0 codec of FIG. 3. Specifically, the transform coefficients are for the Partial-Butterfly. For example, when calculating transform coefficients of the AVS 2.0 codec of FIG. 3A with {X[0]; Y[0]; X[1]; Y[1]}, the value such as {32X[0]+32Y[0]+32X[1]+32Y[1], 42X[0]+17Y[0]−17X[1]−42Y[1], 32X[0]−32Y[0]−32X[1]+32Y[1], 17X[0]−42Y[0]+42X[1]−17Y[1]} can be calculated. Here, when the odd or even parts of each value are extracted, as shown FIG. 4A, they may be represented as rest[0]=8'sd32*X[0]+8'sd32*X[1]; rest[1]= 8'sd32*X[0]−8'sd32*X[1]; rest[2]=8'sd42*Y[0]+8'sd17*Y[1]; rest[3]=8'sd17*Y[0]−8'sd42*Y[1].

FIG. 4A describes 4 exemplary formulas, but the formulas may be different from what is shown in FIG. 4A. In other words, the formulas of FIG. 4A may include transform coefficients of the AVS 2.0 codec of FIG. 3A, and is indicated as a type according to the Partial-Butterfly. In addition, the 8'sd as shown in FIG. 4A indicates computer terms.

In FIG. 4B, information regarding the HEVC codec of FIG. 3B is transform coefficients indicated by using Partial-Butterfly method. For example, when calculating transform coefficients of HEVC codec of FIG. 3B with {X[0]; Y[0]; X[1]; Y[1]}, the values of {64X[0]+64Y[0]+64X[1]+64Y[1], 83X[0]+36Y[0]−36X[1]−83Y[1], 64X[0]−64Y[0]−64X[1]+64Y[1], 36X[0]−83Y[0]+83X[1]−36Y[1]} can be calculated. Herein, when the even or odd parts of each value are extracted, it can be expressed as rest[0]=8'sd64*X[0]+ 8'sd64*X[1]; rest[1]=8'sd64*X[0]−8'sd64*X[1]; rest[2]= 8'sd83*Y[0]+8'sd36*Y[1]; rest[3]=8'sd36*Y[0]−8'sd83*Y[1]; as shown in FIG. 4B.

Although FIG. 4B illustrates 4 exemplary formulas, more formulas may be included. That is, the formulas of FIG. 4B may include transform coefficients of the HEVC codec of FIG. 4B and be expressed as a type according to the Partial-Butterfly. In addition, the 8'sd indicated in the formula of FIG. 4B indicates a program term.

Here, {X[0]; Y[0]; X[1]; Y[1]} indicates a residual for an encoder and dequantized coefficients for a decoder.

Referring back to FIG. 2, after processing information about the first codec and information about the second codec to produce a first transform coefficient of the first codec and a second transform coefficient of the second codec (S210), the similarity between the first transform coefficient of the first codec and the second transform coefficient of the second codec may be determined (S220).

Here, determining the similarity (S220) may include comparing the transform coefficient of the first codec and the transform coefficient of the second codec, calculating a difference between the two transform coefficients, and determining the similarity.

In addition, the decoder may be converted to the multi-format decoder by adding a shifter, adder, and/or a subtractor to the decoder based on the determined similarity (S230).

Here, converting the decoder (S230) may include determining information which is required for transforming the first transform coefficient of the first codec to the second transform coefficient of the second codec based on the calculated difference value.

In addition, converting the decoder (S230) may include adding at least one of a shifter, an adder, and a subtractor to a decoder.

For example, there may be a hardware decoder that performs image processing by using the AVS 2.0 codec as shown in FIG. 4A.

By implementing the hardware decoder capable of performing image processing by using the AVS 2.0 codec as a hardware decoder that uses the HEVC codec, information about the AVS 2.0 codec and information about the HEVC codec may be processed as information through the Partial-Butterfly method including transform coefficients of the AVS 2.0 codec and transform coefficients of the HEVC codec, and then the similarity between the transform coefficient of the AVS 2.0 codec and the transform coefficient of the HEVC codec may be determined.

Here, when determining the similarity, the transform coefficient of the AVS 2.0 codec and the transform coefficient of the HEVC codec may be compared to calculate a difference value, and similarity is determined based on such difference value.

Based on the calculated difference value and determined similarity, the transform coefficient of AVS 2.0 codec can be transformed to a transform coefficient of the HEVC codec. Regarding the above, FIG. 5 will be described.

FIG. 5 illustrates a formula that expresses a difference among different codecs according to an exemplary embodiment.

According to FIG. 5, the difference value is reflected in information including a transform coefficient of the AVS 2.0 codec, and this information is converted to information including a transform coefficient of the HEVC codec.

To be specific, rest[0]=avs2_rest[0]<<1; where the difference value "<<1" is added to _rest[0], which is information including transform a coefficient of AVS 2.0, and "<<" is a left-shift operator that performs bit shifting to the left. The operator represents shifting of the value as much as the value that follows the operating system based on the binary system. Here, "<<" is an operator to perform left shift function, and ">>" is an operator to perform right shift function.

For example, "<<1" indicates shifting to the left by 1, while ">>1" indicates shifting to the right by 1.

Accordingly, avs2_rest[0]<<1 indicates that avs2_rest[0], which is information including a transform coefficient of AVS 2.0 codec, to the left by 1 based in the binary system.

In addition, regarding the formula, rest[1]=avs2_rest[1]<<1, the difference value "<<1" is added to avs2_rest[1], which is information including a transform coefficient of the AVS 2.0 codec. The formula indicates that avs2_rest[1], which is information including a transform coefficient of the AVS 2.0 codec, is shifted to the left by 1 based in the binary system.

In addition, in case of the formula, rest[2]=avs2_rest[2]<<1−Y[0]+Y[1]<<1, the difference value "<<1" is added to avs2_rest[2], which is information including a transform coefficient of the AVS 2.0 codec, and "−Y[0]+Y[0]<<1" is added to indicate that, with reference to avs2_rest[2], which is information including the transform coefficient of the AVS 2.0 codec, avs2_rest[2] is shifted to the left by 1, from which the value of Y[0] is subtracted, and then the value of Y[0] shifted to the left by 1 is added. Here, shifting is performed based on the binary system.

In addition, in the formula, rest[3]=avs2_rest[3]<<1−Y[0]<<1+Y[1], the difference value "<<1" is added to avs2_rest[3], which includes a transform coefficient of the AVS 2.0 codec, and "−Y[0]<<1+Y[1]" indicates that avs2_rest[3], which is information including the transform coefficient of the AVS 2.0 codec, is shifted to the left by 1, the value of Y[0] shifted to the left by 1 is subtracted, and Y[1] is added.

As such, when the difference is calculated by comparing the transform coefficient of the AVS 2.0 codec with the transform coefficient of the HEVC codec, similarity can be determined based on the calculated difference value, and based on the difference value, information required to transform the transform coefficient of the AVS 2.0 codec to a transform coefficient of the HEVC codec can be determined.

Here, as for information required for transforming from a transform coefficient of the AVS 2.0 codec to a transform coefficient of the HEVC codec, information may be included that one shifter corresponding to "<<" is necessary as "<<1" is added, regarding avs2_rest[1], one shifter corresponding to "<<" is necessary as "<<1" is added, regarding avs2_rest[2], "<<1" is added, as "−Y[0]+Y[0]<<1" is added, two shifters corresponding to the two "<<" operators, one subtractor corresponding to "−", and one adder corresponding to "+" may be included; and as for avs2_rest[3], as "<<1" and "−Y[0]<<1+Y[1]" are added, the information that two shifters corresponding to "<<", one subtractor corresponding to "−", and one adder corresponding to "+" are necessary.

In other words, the information including a transform coefficient of the HEVC codec as illustrated in FIG. 5 can be implemented by adding a shifter corresponding to a "<<" operator with respect to a hardware decoder that performs image processing by using the conventional AVS 2.0 codec, an adder corresponding to a "+" operator, and a subtractor corresponding to a "−" operator.

In addition, designing to transform may include adding at least one of a shifter, an adder, and a subtractor to a decoder based on the necessary information and transforming a decoder into a multi-format decoder using the HEVC codec.

For example, in case of the formula, rest[2]=8'sd42*Y[0]+8'sd17*Y[1], related to the AVS2.0 codec, as illustrated in FIG. 4A, and the formula, rest[2]=8'sd83*Y[0]+8'sd36*Y[1], related to the HEVC codec, both a decoder using the AVS 2.0 codec and a decoder using the HEVC codec may be designed, and accordingly a total of 4 multipliers are necessary. In the meantime, a multiplier takes up a large hardware space in general, and if 4 multipliers are used, it would be disadvantageous in terms of chip size.

However, in consideration of a method of designing to transform to a multi-format decoder, rest[2]=8'sd83*Y[0]+8'sd36*Y[1], related to the HEVC codec, when it is expressed using rest[2]=8'sd42*Y[0]+8'sd17*Y[1] relating to the AVS 2.0 codec, it is rest[2]=avs2_rest[2]<<1−Y[0]+Y[1]<<1. Therefore, if it is assumed that rest[2]=8'sd42*Y[0]+8'sd17*Y[1] related to the AVS 2.0 codec is designed as hardware already, by adding two shifters corresponding to the two "<<1" operators to the value of rest[2] related to the AVS 2.0 codec, a subtractor corresponding to the "−" operator, and an adder corresponding to the "+" operator to hardware which has been already designed, rest[2]=8'sd83*Y[0]+8'sd36*Y[1] related to the HEVC codec can be processed.

Accordingly, hardware which is implemented according to a method of designing to transform to a multi-format decoder, when handling rest[2]=8'sd42*Y[0]+8'sd17*Y[1], related to the AVS2.0 codec and rest[2]=8'sd83*Y[0]+8'sd36*Y[1], related to the HEVC codec, rest[2]=8'sd83*Y[0]+8'sd36*Y[1], related to the HEVC codec can be expressed as rest[2]=avs2_rest[2]<<1−Y[0]+Y[1]<<1, and hardware substantially includes two multipliers required for handling rest[2]=8'sd42*Y[0]+8'sd17*Y[1] related to the AVS2.0 codec, one adder, two shifters for handling rest[2]=avs2_rest[2]<<1−Y[0]+Y[1]<<1, one adder, and one subtractor. That is, in case of hardware following the conventional method, when handling rest[2]=8'sd42*Y[0]+8'sd17*Y[1], related to the AVS2.0 codec and rest[2]=8'sd83*Y[0]+8'sd36*Y[1], related to the HEVC codec, four multipliers and two adders are included.

Consequently, the method of designing to transform to a multi-format decoder according to an exemplary embodiment, when compared to the conventional method, may indicate transforming two multipliers and one adder to two shifters, one adder, and one subtractor. Considering that the hardware space requirements for a multiplier is relatively large, hardware space requirements for two shifters, one adder, and one subtractor may be comparatively smaller than those of two multipliers and one adder.

In addition, as for the method of designing to transform to a multi-format decoder according to an exemplary embodiment, as the size of a block increases, such as 8×8, 16×16, and 32×32, and complexity increases, cost reduction rate may increase.

In the meantime, the transformer of the first codec and the second codec according to an exemplary embodiment includes a transform method using the Fourier-related transform. For example, the first codec may include one of the Moving Picture Experts Group (MPEG) 2, H.264, HEVC, and VP9, and in the same manner, the second codec may include one of MPEG 2, H.264, HEVC, and VP9. However, the first codec and the second codec are different from each other.

The computer-readable recording medium according to an exemplary embodiment may record and store a program for executing a method for designing to transform a decoder which performs image processing on a signal using the first codec to a multi-format decoder which performs image processing by using the second codec, the method including the steps of processing information regarding the first codec and the second codec to produce information including a transform coefficient of the first codec and a transform coefficient of the second codec through a predetermined transform method, determining a similarity between the transform coefficient of the first codec and the transform coefficient of the second codec, designing to transform to a multi-format decoder by adding at least one of a shifter, an adder, and a subtractor to the decoder based on the determined similarity.

Here, the predetermined transforming method includes Partial-Butterfly, which divides and processes information regarding a predetermined codec.

In addition, determining the similarity may include calculating the difference value by comparing the transform coefficient of the first codec and the transform coefficient of the second codec and determining the similarity based on the calculated difference value.

In addition, designing to transform may include determining information required to transform the transform coefficient of the first codec to the transform coefficient of the second codec based on the calculated difference value.

In addition, designing to transform may include adding at least one of a shifter, an adder, and a subtractor based on the determined information.

In addition, the transformer of the first codec and the second codec includes a transform method using the Fourier-related transform. For example, each of the first codec and the second codec may be one of MPEG 2, H.264, HEVC, and VP9, and the first codec and the second codec may be different from each other.

In the meantime, the method of designing to transform a decoder, which performs image processing on an image signal by using the first codec, to a multi-format decoder, which performs image processing on an image signal by using the second codec, can be performed by the processor, and according to the control of the processor, an electronic apparatus where a decoder is controlled to perform image performing by using the second codec can be assumed.

Figure 6:
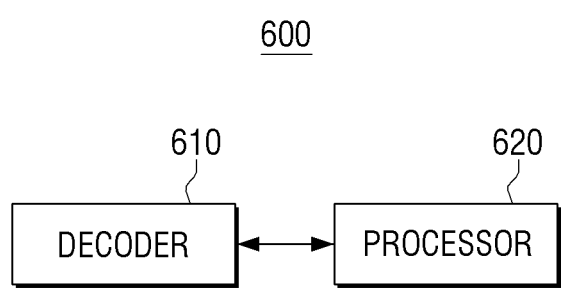
FIG. 6 is a block diagram illustrating a configuration of an electronic apparatus according to an exemplary embodiment.

FIG. 6 is a block diagram illustrating a configuration of an electronic apparatus according to an exemplary embodiment.

In FIG. 6, an electronic apparatus 600 includes a decoder 610 and a processor 620. Here, the electronic apparatus 600 may be any apparatus capable of performing image processing, and can be implemented as various types of electronic apparatuses including a TV, an electronic whiteboard, an interactive table, a Large Format Display (LFD), a smartphone, a tablet computer, a desktop PC, a notebook PC, and a set-top box.

Herein, the decoder 610 may be software, hardware, or a combination of both capable of performing image processing on an image signal by using the first codec.

In addition, the processor 620 may control the decoder 610 to process the information regarding the first codec and the information regarding the second codec to produce information including a transform coefficient of the first codec and a transform coefficient of the second codec through the predetermined transform method, determine a similarity between the transform coefficient of the first codec and the transform coefficient of the second codec, and image process an image signal based on the determined similarity.

Here, the predetermined transform method may include Partial-Butterfly method, which divides and processes predetermined codec information.

In addition, the processor 620 may calculate a difference value by comparing the transform coefficient of the first codec and the transform coefficient of the second codec, and determine the similarity based on the calculated difference value.

In addition, the processor 620, based on the calculated difference value, may determine information which is required for transforming the transform coefficient of the first codec to a transform coefficient of the second codec.

In addition, the processor 620 may transform information about the first codec to the information about the second codec based on the determined information.

In addition, the processor 620 may control so that the information regarding the second codec is provided to the decoder 610 and the decoder 610 performs image processing on an image signal using the second codec.

Here, the method of transforming a decoder which performs image processing may include operations of processing the information relating to the first codec and information relating to the second codec to produce information including a transform coefficient of the first codec and a transform coefficient of the second codec through a predetermined transform method, calculating the difference by comparing the transform coefficient of the first codec and the transform coefficient of the second codec, and determining a similarity based on the calculated difference value. Determining information required for transforming a transform coefficient of the first codec to a transform coefficient of the second codec to a multi-format decoder which performs image processing by a second codec can be applied in the same manner.

In addition, each of the first codec and the second codec may be one of MPEG 2, H.264, HEVC, and VP9, and the first codec and the second codec are different from each other.

In the meantime, a non-transitory computer-readable medium where a program which sequentially performs a control method is stored can be provided.

For example, a non-transitory computer-readable medium which performs processing each of information about the first codec and information about the second codec to information including a transform coefficient of the first codec and information including a transform coefficient of the second codec through a preset transform method; determining similarity between a transform coefficient of the first codec and a transform coefficient of the second codec; and designing to transform the decoder to the multi-format decoder by adding at least one of a shifter, adder, and a subtractor based on the determined similarity can be provided.

The non-transitory computer-recordable medium is not a medium configured to temporarily store data such as a register, a cache, or a memory but an apparatus-readable medium configured to semi-permanently store data. Specifically, the above-described various applications or programs may be stored in the non-transitory apparatus-readable medium such as a compact disc (CD), a digital versatile disc (DVD), a hard disk drive, a Blu-ray disc, a universal serial bus (USB) memory, a memory card, or a read-only memory (ROM), and then provided to a user terminal device.

The foregoing exemplary embodiments and advantages are merely exemplary and are not to be construed as limiting the present inventive concept. The word "exemplary" is used herein to mean "serving as an example or illustration." Any aspect or design described herein as "exemplary" is not necessarily to be construed as preferred or advantageous over other aspects or designs. The exemplary embodiments can be readily applied to other types of apparatuses. The description of the exemplary embodiments is intended to be illustrative, and not to limit the scope of the claims, and many alternatives, modifications, and variations will be apparent to those skilled in the art.

What is claimed is:

1. A method comprising:
processing, via a processor, first information about a first codec and second information about a second codec to produce a first transform coefficient associated with the first codec and a second transform coefficient associated with the second codec, through a predetermined transform method;
determining a similarity between the first transform coefficient associated with the first codec and the second transform coefficient associated with the second codec; and
converting a single-format decoder, which performs image processing on an image signal using the first codec, to a multi-format decoder, which performs image processing on the image signal using the second codec, by adding at least one of a shifter, an adder, and a subtractor to the single-format decoder, based on the determined similarity.

2. The method as claimed in claim 1, wherein the predetermined transform method comprises a partial-butterfly method, which divides and processes information regarding a codec.

3. The method as claimed in claim 1, wherein the determining the similarity comprises calculating a difference by comparing the first transform coefficient associated with the first codec and the second transform coefficient associated with the second codec, and determining the similarity based on the calculated difference.

4. The method as claimed in claim 3, wherein the converting the single-format decoder comprises determining third information required to transform the first transform coefficient associated with the first codec to the second transform coefficient associated with the second codec based on the calculated difference.

5. The method as claimed in claim 4, wherein the converting the single-format decoder comprises adding at least one of the shifter, the adder, and the subtractor to the single-format decoder further based on the determined third information.

6. The method as claimed in claim 1, wherein the predetermined transform method of the first codec and the second codec comprises a Fourier-related transform, wherein the first codec is different from the second codec.

7. A non-transitory computer-readable recording medium storing instructions which, when executed by a processor, cause the processor to perform operations comprising:
processing first information about a first codec and second information about a second codec to produce a first transform coefficient associated with the first codec and a second transform coefficient associated with the second codec, through a predetermined transform method;
determining a similarity between the first transform coefficient associated with the first codec and the second transform coefficient associated with the second codec; and
designing to transform a single-format decoder, which performs image processing on an image signal using the first codec, to a multi-format decoder, which performs image processing on the image signal using the second codec, by adding at least one of a shifter, an adder, and a subtractor to the single-format decoder, based on the determined similarity.

8. The non-transitory computer-readable recording medium as claimed in claim 7, wherein the predetermined transform method comprises a partial-butterfly method, which divides and processes information regarding a codec.

9. The non-transitory computer-readable recording medium as claimed in claim 7, wherein the determining the similarity comprises calculating a difference by comparing the first transform coefficient associated with the first codec and the second transform coefficient associated with the second codec, and determining the similarity based on the calculated difference.

10. The non-transitory computer-readable recording medium as claimed in claim 9, wherein the designing to transform comprises determining third information required to transform the first transform coefficient associated with the first codec to the second transform coefficient associated with the second codec based on the calculated difference.

11. The non-transitory computer-readable recording medium as claimed in claim 10, wherein the designing to transform comprises adding at least one of the shifter, the adder, and the subtractor to the single-format decoder further based on the determined third information.

12. The non-transitory computer-readable recording medium as claimed in claim 7, wherein the predetermined transform method of the first codec and the second codec comprises a Fourier-related transform, wherein the first codec is different from the second codec.

13. An electronic apparatus comprising:
a decoder configured to perform image processing on an image signal by using a first codec; and
a processor configured to control the decoder to:
control the decoder to process first information about the first codec and second information about a second codec to produce a first transform coefficient associated with the first codec and a second transform coefficient associated with the second codec, through a predetermined transform method,
determine a similarity between the first transform coefficient associated with the first codec and the second transform coefficient associated with the second codec, and
based on the determined similarity, perform image processing on the image signal by using the second codec.

14. The electronic apparatus as claimed in claim 13, wherein the predetermined transform method comprises a partial-butterfly method, which divides and processes information regarding a codec.

15. The electronic apparatus as claimed in claim 13, wherein the processor is further configured to:
   calculate a difference by comparing the first transform coefficient associated with the first codec and the second transform coefficient associated with the second codec, and
   determine the similarity based on the calculated difference.

16. The electronic apparatus as claimed in claim 13, wherein the processor is further configured to determine third information required to transform the first transform coefficient associated with the first codec to the second transform coefficient associated with the second codec based on the calculated difference.

17. The electronic apparatus as claimed in claim 16, wherein the processor is further configured to transform fourth information regarding the first codec to fifth information regarding the second codec, based on the determined third information.

18. The electronic apparatus as claimed in claim 13, wherein the predetermined transform method of the first codec and the second codec comprises a Fourier-related transform, wherein the first codec is different from the second codec.

* * * * *